United States Patent
Benton et al.

(10) Patent No.: US 11,416,222 B2
(45) Date of Patent: Aug. 16, 2022

(54) DETERMINING VALIDITY OF MULTIPART BRANCHING LITERATE PROGRAMS

(71) Applicant: Red Hat, Inc., Raleigh, NC (US)

(72) Inventors: William Benton, Madison, WI (US); Sophie Watson, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/551,024

(22) Filed: Aug. 26, 2019

(65) Prior Publication Data
US 2021/0064348 A1 Mar. 4, 2021

(51) Int. Cl.
*G06F 8/33* (2018.01)
*G06F 8/10* (2018.01)
*G06F 11/36* (2006.01)

(52) U.S. Cl.
CPC .......... *G06F 8/33* (2013.01); *G06F 8/10* (2013.01); *G06F 11/3604* (2013.01); *G06F 11/3636* (2013.01); *G06F 11/3664* (2013.01)

(58) Field of Classification Search
CPC .................. G06F 8/33; G06F 8/10
USPC .......................................... 717/113
See application file for complete search history.

(56) References Cited

U.S. PATENT DOCUMENTS

| | | | | |
|---|---|---|---|---|
| 7,860,815 B1 * | 12/2010 | Tangirala | .............. | G06N 5/02 706/45 |
| 7,984,383 B2 * | 7/2011 | Schell | .............. | G06F 9/451 715/771 |
| 9,152,297 B2 * | 10/2015 | Sokolsky | .............. | G06F 3/04817 |
| 2009/0193398 A1 * | 7/2009 | Mitchell | .............. | G06F 8/73 717/137 |
| 2010/0023928 A1 * | 1/2010 | Hentschel | .............. | G06F 11/3604 717/124 |
| 2014/0304036 A1 * | 10/2014 | Sjoblom | .............. | G06Q 30/0269 705/7.32 |
| 2017/0083626 A1 * | 3/2017 | Kensel | .............. | G06N 20/00 |
| 2018/0150378 A1 * | 5/2018 | Gopalswamy | .............. | G06F 8/35 |

FOREIGN PATENT DOCUMENTS

WO 2018226888 2/2019

OTHER PUBLICATIONS

Lei Shi et al., "Contract Visualisation: Sketches for Generic Interfaces", University Scholars Program, National University of Singapore, 2017, 12 pages.
(Continued)

*Primary Examiner* — Lewis A Bullock, Jr.
*Assistant Examiner* — Theodore E Hebert
(74) *Attorney, Agent, or Firm* — Lowenstein Sandler LLP

(57) ABSTRACT

Implementations for verifying validity of a literate programming document are described. An example method may include accessing a first module of a plurality of modules of a literate programming document, wherein the plurality of modules are organized as a directed graph, identifying a first contract associated with the first module, wherein the first contract specifies a first set of input criteria to be satisfied by one or more first input provided to the first module and a first set of output criteria to be satisfied by one or more first output generated by the first module, and determining whether the one or more first output satisfies the first set of output criteria when the one or more first input satisfies the first set of input criteria.

20 Claims, 5 Drawing Sheets

(56) References Cited

OTHER PUBLICATIONS

"Interactive and Reactive Data Science using Scala and Spark", GitHub 2019, 4 pages http://spark-notebook/spark-notebook.
Michael D. Kickmeier-Rust et al., "Immersive Digital Games: The Interfaces for Next-Generation E-Learning?", Dept. of Psychology, University of Graz, 2007, 10 pages.

* cited by examiner

DETERMINING VALIDITY OF MULTIPART BRANCHING LITERATE PROGRAMS

TECHNICAL FIELD

The disclosure is generally related to literate programming, and more particularly, to determining validity of multipart branching literate programming documents.

BACKGROUND

Literate programming is a programming paradigm in which an explanation for a computer program is given with regards to the program logic in a natural language, such as English, along with snippets of macros and traditional source code, from which a compilable source code can be generated. In a literate programming environment, an author can write sections of instructional content with each section devoted to a particular area or sub area of a programming concept. Each section can contain a subsection for a subsection for a source code, a natural language explanatory narration with regards to the source code, and visualization of the output from running the source code.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
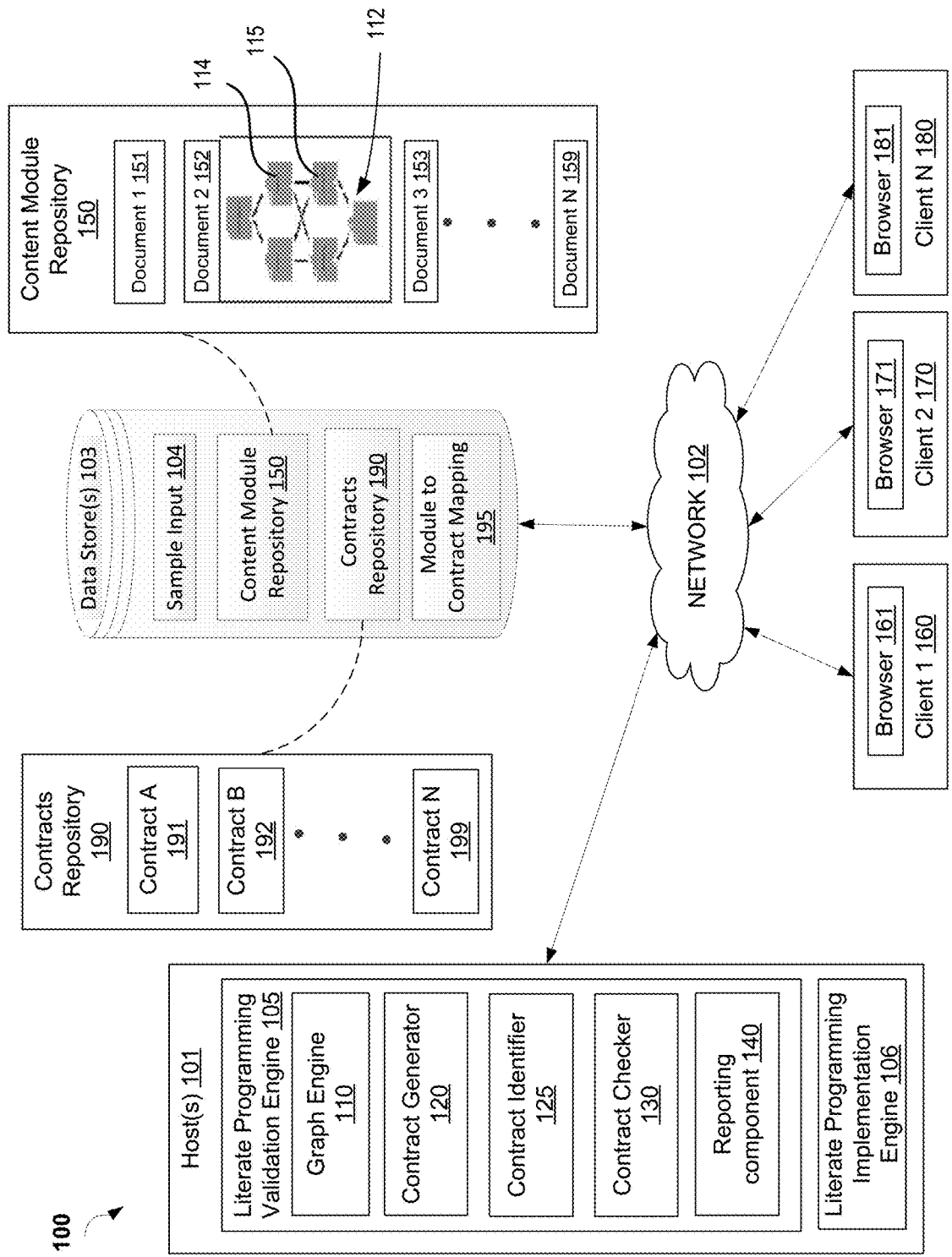
FIG. 1 depicts a high-level block diagram of an example computer system architecture, in accordance with one or more aspects of the disclosure.

Described herein is a system for determining validity of a literate programming document. Literate programming environments allow for interactive tutorials for teaching and demonstrating programming concepts, programming languages, computing techniques, etc. Typically, the tutorials can consist of multiple documents presented in a sequential order. Literate programming environments can be used to explain a programming concept to a user, provide sequence of source codes associated with the concept, let the user execute the sequence of source codes, and provide visualization of the output generated by executing the source codes so the user can understand the effect of executing the source codes. The user can interact with a literate programming document (also referred to herein as a "document" and "notebook") by changing supplied input values and/or making changes to the source code. A literate programming document can be directed towards a particular programming concept that includes multiple sections. For example, a literate programming document may involve a data structure programming concept, specifically a "priority heap." In one example, one section of the concept may involve interface functions for the priority heap, another section of the may involve representation of the priority heap, etc. As such, a literate programming document can include multiple modules, each module of the multiple modules directed towards each section of the programming concept covered by the document. In some scenarios, the sections of the programming concept may be presented in a particular order, for example, to develop understanding of the concept, satisfy dependency requirements, etc.

Conventionally, a literate programming document is designed in a linear manner. The modules of a document are generally presented serially, one after another, to cover the various sections of a particular concept. Some sections can contain concepts that can be implemented in more than one way. In some examples, the different ways of implementations are presented one after another. However, it can be difficult to enable users to truly understand the concept from start to finish when the various implementation options are presented in a linear manner. The user is not usually given an option to choose one of the implementations to learn. When the user learns all the different implementation options before moving on to the next section of the concept, the user can miss to make the connection between one section to another section. In some examples, the user may be only presented with one particular way of implementation even when multiple ways exist, regardless of user's skillset, strength, preference or interest. In that case, user does not learn other ways to implement the concept in that section.

In addition, the different ways of implementation can generate different results, and as such the sections cannot be presented cohesively in the document because the document cannot integrate outputs from one section and use them as input into another section. For example, output of a first section using a first way of implementation can be different from the output of the same first section using a second way of implementation. The subsequent, second section, has to be able to receive the output of the first section as the input of the second section. However, if the output varies based on selected implementation, then the second section may not be able to accept the output due to incompatibility. Thus, with varying implementations, it may not be possible to design integrated modules that can utilize outputs from the previous module. As a result, the sections of a programming concept can seem disconnected and user can have a difficult time understanding how to implement a programming concept from beginning to end.

Aspects of the disclosure address the above and other deficiencies by providing technology that allows for organizing modules of a literate programming document as branching content. The branching contents can allow the user to select a module that is one of the multiple ways of implementation for a section of the programming concept, and after finishing the module, the user can proceed to a module covering a subsequent section of the programming concept. The modules can be organized as a directed graph of modules. The technology can identify a contract associated with each module that specifies a set of input criteria and a set of output criteria for the module. The input criteria describes the type of input that the module can accept and output criteria describes the type of output that the module generates. Input and output criteria in the contract can be specified in view of preceding and subsequent modules, respectively. The technology then determines whether for all possible executions of the module an output generated by the module satisfies the output criteria when an input provided to the module satisfies the input criteria. If it is determined that the output criteria is satisfied when input criteria is satisfied, then an indication is provided that the module is valid. The technology can also determine that output from a preceding module satisfies the input criteria of the current module and that output from the current module satisfies the input criteria of the subsequent module specified in a contract corresponding to the subsequent module.

As such, the systems and methods described herein include technology that enhances utilization of computing resources, such as processor usage and memory usage, for a computer system. In particular, aspects of the disclosure provide technology directed to a validation engine that enhances the efficiency and/or performance of a computing system by ensuring that the modules of a literate programming document are valid prior to or during execution of the document. This may enhance the efficiency and performance of the computer system by reducing processor usage and improving network bandwidth, for example, associated with attempting to execute a literate programming document that is invalid and fails to be executed. The security and composability afforded by the validation engine is advantageous for robustness of the computer system, reduced impact of human errors and machine errors in development of the documents, reduced chance of components of the document breaking when there is a modification associated with the documents, reduced human effort in error-checking the documents, and improved reproducibility of the documents and associated source codes.

Various aspects of the above referenced methods and systems are described in details herein below by way of examples, rather than by way of limitation.

FIG. 1 is a block diagram of a network architecture 100 in which implementations of the disclosure may operate. In some implementations, the network architecture 100 may be used to implement a literate programming validation engine in accordance with implementations of the disclosure. The literate programming validation engine can support one or more of a graph engine, a contract generator, a contract identifier, a contract checker, and a reporting component in a distributed system implemented using network architecture 100.

In one implementation, the network architecture 100 includes one or more hosts 101 communicably coupled via a network 102 to a data store 103, and one or more clients 160-180. Hosts 101 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. In one example, hosts 101 may be a computing device implemented with x86 hardware. In another example, computer system 100 may be a computing device implemented with PowerPC®, SPARC®, or other hardware. Hosts 101 may be part of a dedicated server, a data center, a cloud computing environment, a continuous integration and deployment pipeline (CI-CD), etc. In the example shown in FIG. 1, hosts 101 may include various components, including but not limited to, a literate programming validation engine 105 and a literate programming implementation engine 106. Literate programming validation engine 105 and literate programming implementation engine 106 may be hosted on the same host machine or separate host machine of hosts 101.

The network 102 may be may be a private network (e.g., a local area network (LAN), a wide area network (WAN), intranet, or other similar private networks) or a public network (e.g., the Internet). The network 102 can include any number of intermediate computing devices and network elements between the hosts 101, data store 103, and/or clients 160-180. The network 102 can include any number or combination of wired and wireless communication mediums between the nodes in the network.

Literate programming validation engine 105 and literate programming implementation engine 106 may use data from or store data and/or instructions to data store 103. Data store 103 may include any non-persistent data storage (e.g., memory), persistent data storage (e.g., flash storage, hard drive, tape), other medium, or combination thereof that is capable of storing instructions for carrying out the operations of the components and modules discussed herein. Data store 103 may include various data and repositories, including but not limited to, sample input 104, content module repository 150, contracts repository 190, module to contract mapping 195, etc. Data store 103 may be divided into multiple data stores that each store different types of data and/or repositories described herein.

Client computer systems, such as clients 160, 170 and 180, may be connected to hosts 101 via network 102. Each client 160, 170, 180 may be a mobile device, a PDA, a laptop, a desktop computer, a tablet computing device, a server device, or any other computing device. In some implementations, users can interact with literate programming documents (e.g., documents 151-159) executed by literate programming implementation engine 106 using one or more of clients 160, 170, and 180 via corresponding web browser applications 161, 171 and 181. For example, a user can access document 152 via browser 161 using client 160. The user can interact with the document 152, such as, read explanatory narration, execute source code, receive visualization of the output, make modifications to input and/or source code, etc. Literate programming implementation engine 106 may receive the interaction and execute the document 152. In other implementations, the documents may be hosted and executed directly on hosts 101.

Literate programming validation engine (also referred herein as "validation engine") 105 may be used to ensure validity of modules of a literate programming document. Validation engine may be used to guarantee the quality and correctness of a tutorial presented via the literate programming document by validating input and output interfaces of each of the individual modules in isolation. Validation engine 105 may include various components, such as, a graph engine 110, a contract generator 120, a contract identifier 125, a contract checker 130, and a reporting component 140. More or less components may be included without loss of generality. For example, two or more of the components or portions of the components may be combined into a single component, or one of the components may be divided into two or more sub-components. In one implementation, one or more of the components or sub-components may be executed by different processing devices on different computing devices (e.g., different host machines).

The graph engine 110 may generate a directed graph of a plurality of modules of a literate programming document. The contract generator 120 may generate a contract associated with each module to specify a set of input criteria and a set of output criteria for the module. The contract identifier 125 may identify the contract that is associated with a particular module. The contract checker 130 may determine whether an output generated by the module satisfies the output criteria when an input provided to the module satisfies the input criteria. The reporting component 140 may be used to indicate the results of running the contract checker, such as, the module is valid or not valid. Hosts 101 may also include literate programming implementation engine (also referred herein as the "implementation engine") 106. As discussed previously, implementation engine 106 may render and execute the literate programming document(s) that are presented via the browsers.

In one implementation, data store 103 may include a content module repository 150 that stores literate programming documents (e.g., document 1 through document N). A literate programming document can include instructional content related to a programming concept and describe various programming logic under the programming concept. In an example, the literate programming document can represent a tutorial. The document can be divided into multiple modules that each cover a smaller unit, such as, a section covering one technique, within a larger topic of the programming concept. In some examples, a module itself can be a distinct document. As such, a literate programming document can comprise of multiple documents within itself. The modules can individually or in combination include source code for the unit covered in the module, natural language (e.g., English) explanatory narration, for example, related to the source code, visualization of the execution of the source code, input values or path to input files, etc. The source code may be compilable. The module can be executed, for example, by using browsers 161-181. In some examples, the modules can be interactive, that is, a user can change an input value or update the source code in a module using the browser and execute the module.

In some implementations, a developer may create the document (e.g., document 151-159). In some examples, a human user is the developer who may design the document and manually write various portions of the documents, including deciding how each module is divided. In some examples, the document may be created automatically (e.g., without any user interaction) by a developer that is a computer software. For example, the document can be generated using source code and description from an existing software program, using machine learning algorithms, etc. The document, including the various modules, can be stored in data store 103.

In some implementations, the notebook (e.g., literate programming document) may contain various implementations of a single technique included in the document. Each module can include a different implementation of the technique. In this manner, a user can choose to examine and execute a single module to learn one implementation of a technique and skip the other modules covering the other implementations of the same technique. The modules of the document can be organized as branching content. In one example, the branching content can be structured using a directed graph of modules. The directed graph of modules is made up of a set of vertices (e.g., nodes) connected by edges, where the edges have a direction associated with them. Each node, or vertex, of the directed graph can represent a module, and the edges point to the direction of the subsequent module. In the flow of a document covering a larger concept that includes multiple techniques (e.g., smaller units or sections), the techniques can be presented using a particular order of the techniques that the developer defines. At certain points in the flow of the document, the content of document may be presented with branches when there is a technique with multiple implementations. Each implementation of the technique is represented in a node of the directed graph, and is connected by an edge within the graph from the previous one or more modules representing the previous technique. The modules are also connected by edges to one or more modules of the subsequent technique. The direction of the edges indicate the order of the techniques. An edge is pointed from a module of a previous technique to the direction of a module of the next technique. The branches of the graph diverge when there are multiple modules representing multiple implementations of a technique, where selecting a given choice of the implementation restricts the spaces of choices made in the rest of the document. The branches of the graph converge when multiple implementations lead to one module of a technique, where a selection point represents multiple independent ways of achieving a result that would be used by a common remainder of the document. FIG. 1 depicts a directed graph 112 of multiple modules (e.g., modules 114, 115, etc.) that are included in document 152. A more detailed example is depicted in FIG. 2, as described below.

Figure 2:
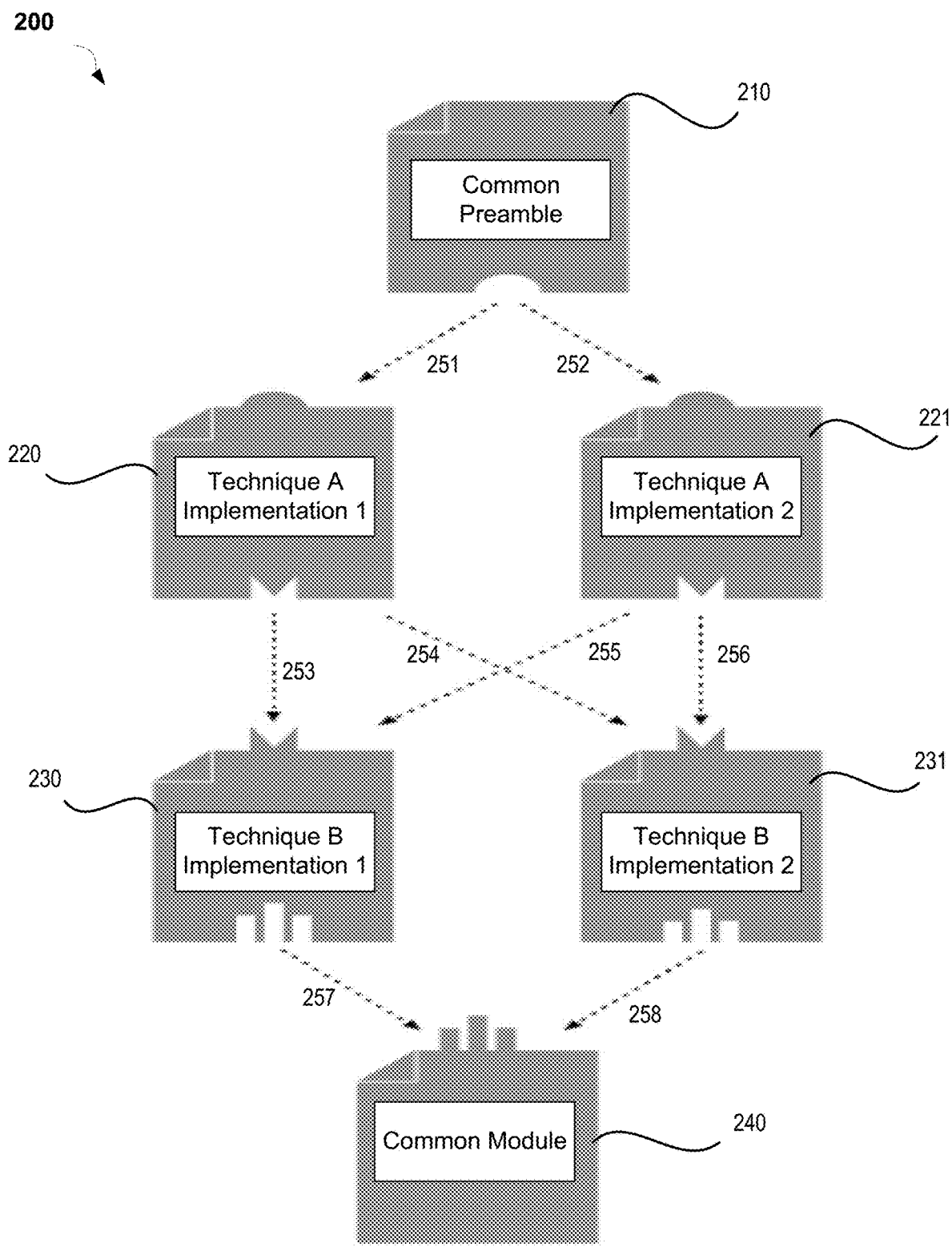
FIG. 2 depicts an example of a literate programming document directed graph, according to one or more aspects of the disclosure.

FIG. 2 depicts an example of a literate programming document directed graph 200, according to one or more aspects of the disclosure. The directed graph 200 is made up of modules 210 through 240. The modules 210-240 represents the nodes of graph 200. The nodes (e.g., the modules 210-240) are connected by edges 251 through 258. Each edge has a direction. For example, edge 251 has a direction from module 210 to module 220, indicating that module 220 is the subsequent module after module 210. In an example, module 210 covers a common preamble of a programing concept described in the document. The common preamble may include an introduction to the upcoming stages, such as, an overview of the subject area, any source code to generate data for use in the subsequent modules, any code to clean any existing data, etc. The graph 200 diverges after module 210 in two branches through edge 251 and edge 252. After covering the common preamble in module 210, the programming concept covers a technique A, which can be implemented in two different ways, implementation 1 and implementation 2. Module 220 includes implementation 1 of technique A and module 221 includes implementation 2 of technique A. One or more output generated from module 210 is used to provide one or more input of module 220 as well as module 221. As such, module 220 and module 221 both have to be able to accept the output generated from module 210.

Similarly, after technique A, the concept covers a technique B, which can also be implemented in two different ways, implementation 1 and implementation 2. Module 230 includes implementation 1 of technique B and module 231 includes implementation 2 of technique B. Module 220, which covers implementation 1 of technique A, is connected by edge 253 and edge 254 to the two subsequent modules 230 and 231. Similarly, module 221, which covers implementation 2 of technique A, is connected by edge 255 and edge 256 to the two subsequent modules 230 and 231. The direction of edges 253-256 from technique A to technique B indicate that the modules covering technique B are the subsequent modules after those covering technique A. After technique B, the concept converges into a common module 240, connected via edges 257 and 258. The common module may include content relevant to all techniques implemented in previous modules. Common modules can be used when there is only one implementation or workflow identified for that specific step of the concept. The common module 240 has to be able to accept the output(s) generated by any of its preceding modules 230 and 231. In some implementations, each module may include fields to identify one or more preceding module and/or one or more subsequent modules. In some implementations, a particular order of the modules may be identified in the data store 103.

In a first illustrative example, a literate programming document may cover a topic in data structure. The particular concept being covered by the modules of directed graph 200 maybe on "priority heap." The document may include content to simulate a coffee shop. The common preamble in module 210 may include content related to data generation or loading, source code for processing the data and determining the priority of each item in the priority heap, etc. Technique A may be directed towards a function for mapping from particular values to priorities. Technique A can be implemented in several ways. Examples of various implementations of the function can include:

Module 220: Implementation 1: assume Customer values (arrival time, job size)→arrival time.

Module 221: Implementation 2: assume Customer values (arrival time, job size)→job size.

Module 222 (not shown): Implementation 3: assume Customer values (arrival time, job size)→inverse job size.

Technique B may be directed towards representing the priority heap, and can be implemented in several ways. Examples of various implementations of the technique can include:

Module 230: Implementation 1: represent as a tree.

Module 231: Implementation 2: represent as an array.

The common module 240 may take any example from technique A and any example from technique B and lets the user interact with a heap to evaluate how it performs for given tasks. For example, if the document covers modeling queueing policies for a coffee shop, the user can experiment with the policy module to answer questions, such as, does it make sense to serve the shortest jobs first (e.g., to let a filter coffee order go ahead of several elaborate espresso drink orders in the queue), does the coffee shop work better if there is a notion of fairness (e.g., might some orders have to wait indefinitely), does it make sense to preempt long-running orders to allow others to the front of the line, etc. The different policies for scheduling orders are technique A. Other questions that could be explored and answered in the common modules: what is the relative performance of a data structure and policy combination developed in the course of a user's (e.g., student's) experience of the document (e.g., tutorial), which representation performs better when the coffee shop is able to serve customers with a bounded number of customers in the queue, which one performs better if the number of customers is allowed to grow without bound, etc. The different representations are technique B. As such, for example, after module 210 (common preamble), the graph diverges into two branches and the user can select one of the two modules 220 and 221. The user can select module 221 (implementation 2 of technique A), and after finishing the module, the graph diverges again into two branches (module 230 and 231) and user can select module 230 (implementation 1 of technique B). After finishing the module, user can proceed to the common module 240. User can skip module 220 and 231 and still be able to finish the priority heap concept from beginning to end, learning at least some of the tradeoffs and details involved in the techniques used for the concept.

In a second illustrative example, a literate programming document may cover a topic in machine learning. The document may include content for spam detection using machine learning. The common preamble in module 210 may include content related to data generation (e.g., create the raw documents used for the remainder of the modules), data visualization code (e.g., visual representation of the documents simulated by the data generator, model evaluation code (e.g., baseline model for spam detection and methods for evaluating how good a model is), etc. Technique A may be directed towards feature engineering, which can transform the raw documents into an input which can be used as input for machine learning models. Technique A can be implemented in several ways. Examples of various implementations of the function can include: Module 220: Implementation 1: general summaries of the raw documents such as: number of words, average word length, pieces of punctuation, length of longest word, length of shortest word, etc.; Module 221: Implementation 2: TF-idf (Term frequency–inverse document frequency): a numeric vector capturing how important words are within the documents.

Technique B may be directed towards modelling, which is training the model which classifies the raw document. Technique B can be implemented in several ways. Examples of various implementations of the technique can include:

Module 230: Implementation 1: Random Forest model.

Module 231: Implementation 2: Logistic regression model.

The common module 240 may include data drift identification, deployment of the model generated through technique B to a production environment, etc.

Returning to FIG. 1, validity engine 105 can be used to determine validity of the literate programming documents (e.g., document 152). Particularly, validity engine 105 can determine validity of the modules included in the directed graph of the modules. In some implementation, the directed graph of the modules may be created by the developer by indicating the nodes and edges of the graph and connecting the modules by indicating the subsequent module. In some implementation, the graph engine 110 may generate the directed graph of a plurality of modules of a literate programming document. In some example, the developer can enter the relationships between the modules into a user interface and the graph engine may generate a directed graph of the modules using the relationships.

In one implementation, data store 103 may include a contracts repository 190 that stores interface contracts (e.g., contract A through contract N) for each of the modules of the directed graph identified in the content module repository 150. Each contract specifies a criteria for valid input and output of the module. That is, the contract specifies a set of input criteria to be satisfied by one or more input provided to the corresponding module and a set of output criteria to be satisfied by one or more output generated by the corresponding module.

The contract may specify the input the module can consume and the output the module can return or provide. In an example, the content of a contract may specify, in a machine readable equivalent language, that: "this module consumes a file containing records consisting of an unsigned integer that uniquely identifies the record, a boolean label, and a 64-element vector of floating-point numbers. It returns a serialized function mapping from 64-element vectors of floating-point numbers to boolean-valued predictions." In another example, a contract may specify: "this module consumes a text file and a list of string labels. It returns a file containing records consisting of an unsigned integer that uniquely identifies the record, a boolean label, and a 64-element vector of floating-point numbers." In yet another example, the contract may specify: "this module consumes a large record-oriented file, a function to generate a key (of arbitrary type) given a record, and a function that compares two keys (of the same type as the first function) and returns true if the first key is less than or equal to the second under some ordering. It produces a record-oriented file consisting of the same records as the first file, but ordered so that the keys generated from each record by the first function are in increasing order given the ordering implemented in the second function."

For example, for the first illustrative example depicted in FIG. 2 of the priority heap, a corresponding contract for a module can specify an output criteria to be: "returns a structure that has three operations: put(priority, obj), take( ) and size( ), such that put increases size by one, take returns the element with the highest priority and reduces the size by one, etc." It should be noted that the foregoing are examples for illustrative purposes only, and the actual content of the contracts may differ, such as, in format, language, etc. For the second illustrative example depicted in FIG. 2 of the spam detection, a contract for technique A (e.g., modules 220 and 221) may specify an input criteria to include "a pandas data frame, where each row has a column labelled "text", indicating the location of the text from the documents and a label stating 'spam' or 'legitimate.'" For the technique B, contracts for each of the two implementations (e.g., module 230 and 231) may specify an input criteria to include: "a pandas data frame, with each row containing a vector of floating point numbers, as well as a label stating 'spam' or 'legitimate.'" For the common module 240, the contract may specify the input criteria to include "a serialized model which takes in text strings (documents) and returns a prediction of 'spam' or 'legitimate.'"

The scope of the interface contracts may vary. Examples of kinds of content in the contracts may include, but not be limited to, static type annotations (with first-order types, structures, arrays, etc.), parametric type annotations (with higher-order types whose constituents are parameterized on other types), dependent type annotations (in which types may be parameterized either on other types or on expressions in a host language), dynamically-evaluated assertions, unit tests, property-based tests, or other functional tests.

In some implementations, a contract developer (e.g., a human user) can write an interface contract for modules in the document. In other implementations, contract generator 120 can automatically (e.g., without any human user interaction) generate a contract corresponding to a module. In an example, contract generator 120 can infer a machine readable contract from a module of the notebook. The contract can be inferred in various ways. In an example, the contract can be automatically (e.g., without any user interaction) inferred from the source code included in each module. For example, if a and b are both integers defined within the source code, it can be inferred that the operation of "a+b" within the code will also result into an integer. In some implementations, the input criteria for a current module may be specified based on a preceding module when a preceding module exists, such that the output of the preceding module is compatible with the input of the current module. In some implementations, the output criteria for a current module may be specified based on a subsequent module when a subsequent module exists, such that the output of the current module is compatible with the input of the subsequent module.

In an implementation, contract identifier 125 may identify a contract associated with a particular module of the directed graph. The particular module may be the module for which validity is being checked on. As described previously, for each module, a corresponding contract may exist. In some example, the contract identifier 125 may automatically (e.g., without any user interaction) identify the contract corresponding the module using a module to contract mapping table that includes identifiers of contracts corresponding to a module. In some example, a module to contract mapping 195 may be stored in data store 103.

In an implementation, contract checker 130 may be used to automatically (e.g., without any user interaction) determine validity of the particular module. The contract checker can access the particular module and analyze the particular module to verify the validity of the module in view of the corresponding contract. In an example, the contract checker 130 may determine whether an output generated by the particular module satisfies the output criteria when an input provided to the module satisfies the input criteria. Contract checker 130 verifies that under all cases, a notebook module satisfies the output portion (e.g., set of input criteria) of its corresponding contract so long as the input portion (e.g., set of output criteria) of the contract is satisfied. For example, for the contract specifying that "this module consumes a text file and a list of string labels; it returns a file containing records consisting of an unsigned integer that uniquely identifies the record, a boolean label, and a 64-element vector of floating-point numbers," the contract checker determines whether the output criteria (e.g., a file containing records consisting of an unsigned integer with the specified criteria) is satisfied by the output generated by the particular module, when the input criteria is satisfied (e.g., a text file and a list of string labels are provided as input to the particular module).

In one example, the determination of validity of the output may be performed automatically (e.g., without any user interaction) using a proof by exhaustion operation (e.g., an exhaustive proof search) associated with execution of the particular module. The proof operation (e.g., a proof search) may involve working through constraints and quantifiers. As an example of a constraint, a data structure may comprise a collection of objects representing coffee orders, which provides a certain minimal interface but impose no restrictions on its representation. As an example of a quantifier, a given constraint holds on a polymorphic type for any kind of value included within it (e.g., "this function returns the length of an order queue given any type of queue") whether it is modeling a coffee shop or an assembly line. In an example, the statement to be proved is split up in a finite number of cases and each type of case is checked to see if the proposition in question holds. A proof search for the modules may involve proving that for all possible execution of the module, if the input criteria is met, so is the output criteria, and in the alternative, showing that it is impossible to prove it for all possible executions.

In another example, the determination of validity of the output is performed automatically (e.g., without any user interaction) using a set of sample inputs satisfying the first set of input criteria. In some scenarios, an exhaustive proof search may not be feasible, practical, and/or desired. As an alternative, a trial and error process may be used to verify whether the output criteria is met. A set of sample synthetic inputs may be obtained from a space of valid inputs according to the input criteria identified in the contract. In some examples, a set of sample input 104 may be stored in data store 103. Using each of the sample inputs, it can be automatically (e.g., without any user interaction) verified that the outputs generated using the sample input are valid as well, according to the output criteria identified in the contract. In some example, the sample inputs can include a library of example valid inputs supplied by a human developer or a software algorithm (e.g., a machine learning system) to test the process.

In some implementations, the contract checker 130 may check the validity of the module in view of one or more subsequent modules. The contract checker 130 may access the subsequent module(s) of the particular module identified by the direction of the edges connecting the modules from the particular module to the subsequent module. The output of the particular module may be provided as direct input (e.g., as is) or indirect input (e.g., after processing the output further or appending additional content to the output) for the subsequent module(s). The contract checker 130 may determine whether the output of the particular module satisfies a set of input criteria specified in a contract identified by contract identifier 125 that corresponds to a subsequent module.

For example, in the second illustrative example of FIG. 2 involving spam detection, contract checker 130 determines whether the output of the feature engineering modules of technique A in module 220 (e.g., the particular module) or module 221 are in the form expected by the two different implementations of technique B in module 230 or 231 (e.g., subsequent modules), as specified in the corresponding contracts to be "a pandas data frame, with each row containing a vector of floating point numbers, as well as a label stating 'spam' or 'legitimate.'" Similarly, contract checker 130 determines whether the output of the modelling modules (e.g., technique B) 230 and 231 are in the form expected by the common module 240, as specified in the corresponding contract to be "a serialized model which takes in text strings (documents) and returns a prediction of 'spam' or 'legitimate.'"

In some implementations, the contract checker 130 may check the validity of the module in view of one or more preceding modules. The contract checker 130 may access the preceding module(s) of the particular module identified by the direction of the edges connecting the modules from the preceding module to the particular module. The output of the preceding module may be provided as direct input (e.g., as is) or indirect input (e.g., after processing the output further or appending additional content to the output) for the particular module. The contract checker 130 may determine whether the output of the preceding module satisfies a set of input criteria specified in a contract for the particular module. For example, in the second illustrative example of FIG. 2 involving spam detection, contract checker 130 determines whether the output of the data generator in the common preamble of module 210 (e.g., a preceding module) is in the form which the two different implementations of technique A in module 220 (e.g., the particular module) or module 221 expects, as specified in the corresponding contracts to be "a pandas data frame, where each row has a column labelled "text", indicating the location of the text from the documents and a label stating 'spam' or 'legitimate.'"

In some implementations, the contract checker 130 can check the validity of the modules after the developer creates the modules and prior to a user executing the modules. In some implementations, the contract checker 130 can check the validity of the modules periodically as part of source control check-in or continuous integration.

In some implementations, the contract checker 130 can check the validity of the modules after receiving a modified version of the particular module. In an example, a user may modify the particular module of the notebook using browser 161, for example, by changing the source code portion of the interactive module. Validation engine 105 may automatically receive the modified version of the particular module. The contract checker 130 may automatically determine whether the output generated by the modified version of the particular module satisfies the output criteria specified in the contract corresponding to the particular module, when the input provided to the modified version of the particular module satisfies the input criteria in the contract.

The reporting component 140 may be used to provide indication of the results of executing the contract checker 130. If the particular module is valid, the module may be released (e.g., made available) to be ready to execute by users. If the particular module is indicated as invalid, the module may be put on hold from being released to the users for execution, and/or be provided back to the developer to implement a fix that can satisfy the validity test. In some examples, responsive to determining that the output of the particular module satisfies the set of output criteria when the input satisfies the input criteria, reporting component 140 may provide an indication that the particular module satisfies a validity test. In some examples, responsive to determining that the output of the particular module does not satisfy the output criteria when the input satisfies the input criteria, reporting component 140 may provide an indication that the particular module fails to satisfy, or does not satisfy, a validity test. The validity test can include whether the particular module is valid or not valid. Among other factors, a valid module satisfies input criteria in the contract in order to be able to receive input from two different preceding modules and satisfies the output criteria to be able to provide output to two different subsequent modules. In some example, the reporting component 140 may include a reporting user interface (UI) to provide the indication to the user. The reporting UI may be used to keep track of the modules that satisfy the validity test and the modules that do not satisfy the validity test. The reporting UI may be used to identify modules that need further modification to satisfy the validity test and the criteria in the contract.

Figure 3:
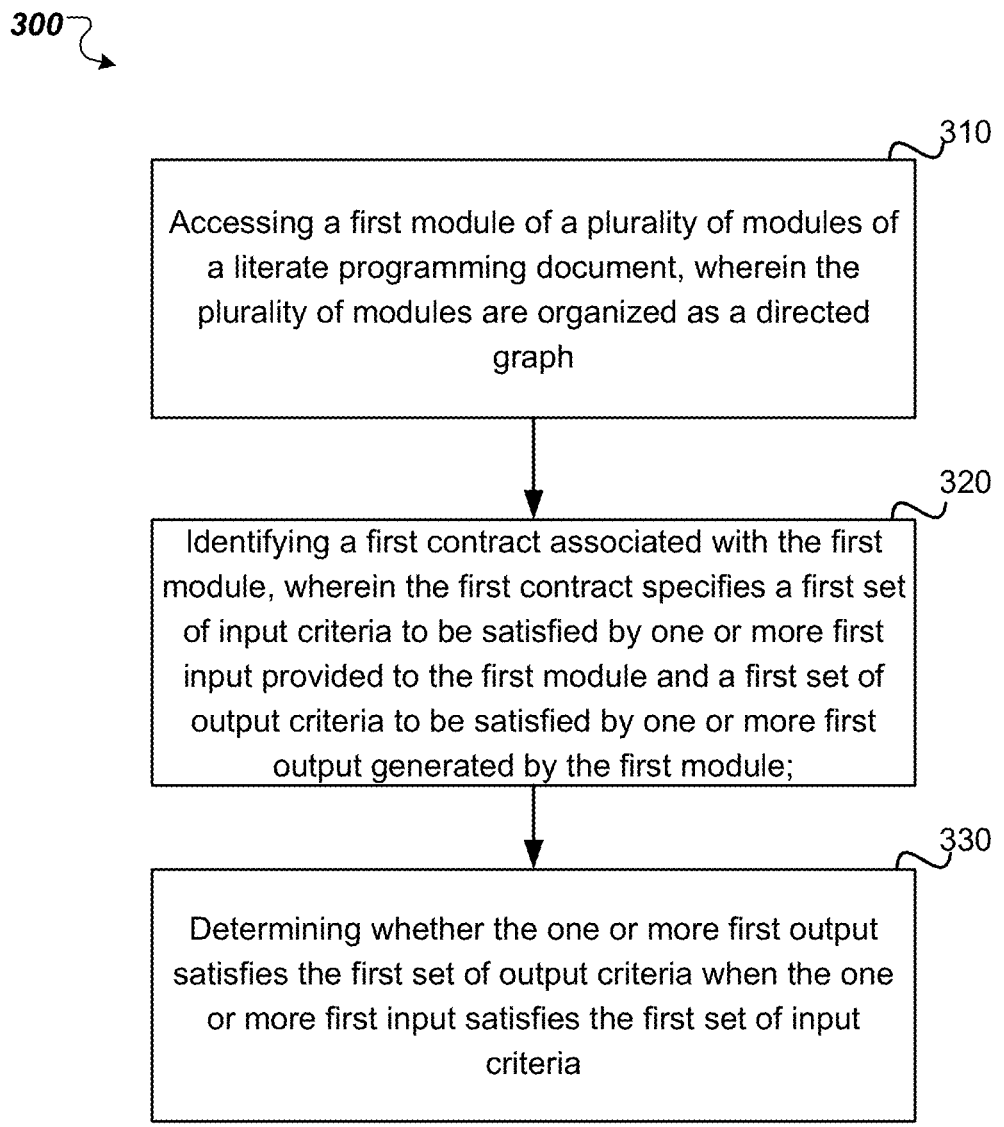
FIG. 3 depicts a flow diagram of an example method for determining whether the output criteria for a module of literate programming document is satisfied, in accordance with one or more aspects of the disclosure.
Figure 4:
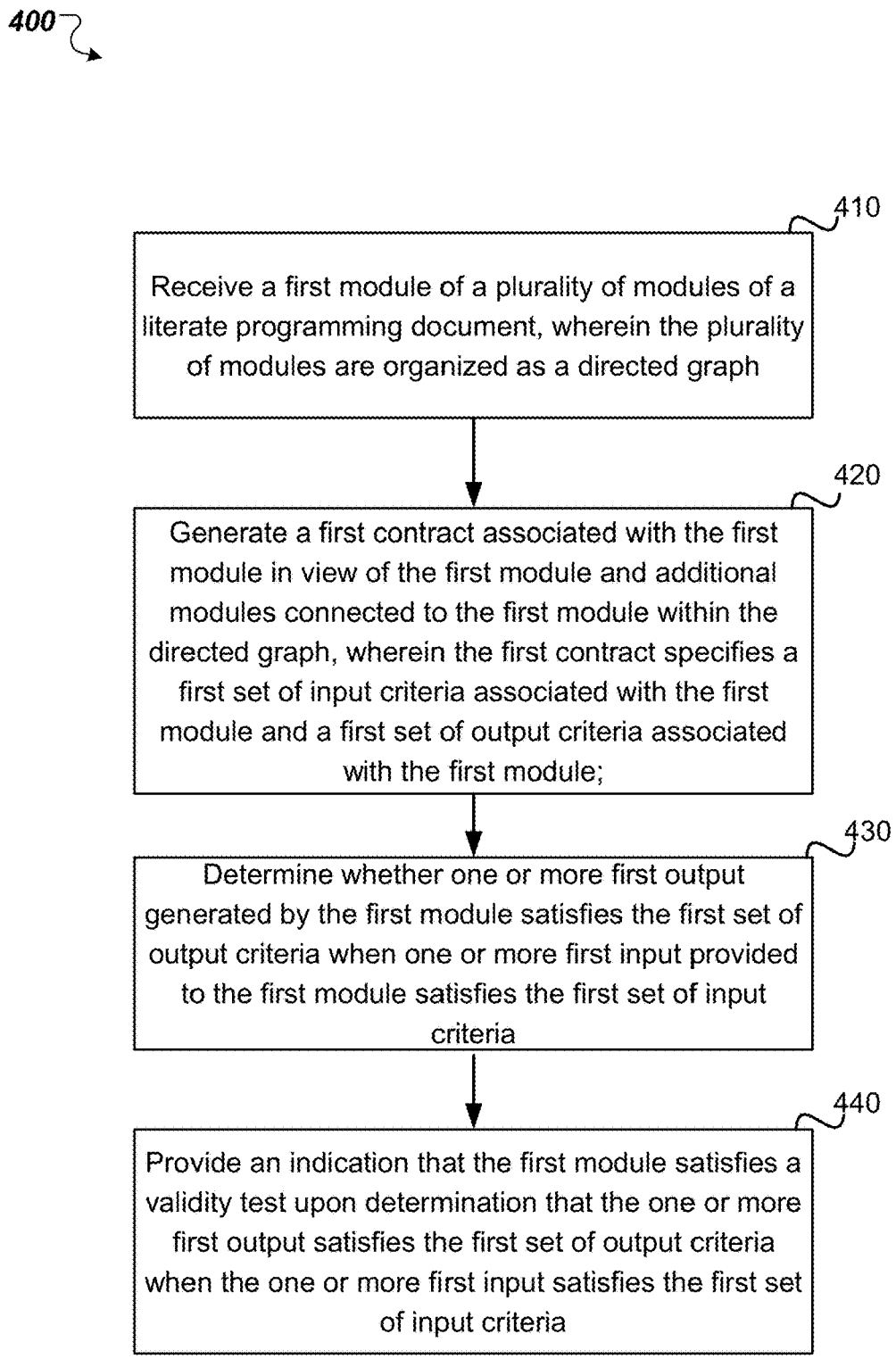
FIG. 4 depicts a flow diagram of an example method for generating a contract to determine validity of a module of a literate programming document, in accordance with one or more aspects of the disclosure.

FIGS. 3 and 4 depict flow diagrams for illustrative examples of methods 300 and 400 for determining validity of a literate programming document, in accordance with one or more aspects of the disclosure. Method 300 illustrates an example process flow for determining whether the output criteria for a module of literate programming document is satisfied, according to at least one implementation. Method 400 is an example process flow for generating a contract to determine validity of a module of a literate programming document, according to at least one implementation.

Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by literate programming validation engine 105 as shown in FIG. 1.

Referring to FIG. 3, method 300 may be performed by processing devices of a server device or a client device and may begin at block 310. At block 310, a processing device may access a first module of a plurality of modules of a literate programming document. The first module may be accessed automatically (e.g., without any user interaction). The plurality of modules may be organized as a directed graph. In some examples, the literate programming document includes instructional content describing programming logic included in the literate programming document. The instructional content may include source code, visualization, natural language explanatory narration, or a combination thereof. In some examples, the plurality of modules are executable. In some examples, the source code in the module is compilable. In some examples, each module of the plurality of modules is connected by edges within the directed graph to at least one preceding module or at least one subsequent module, or a combination thereof. For example, a particular module may be connected to no preceding module, only one preceding module, or more than one preceding module. Similarly, the particular module may be connected to no subsequent module, only one subsequent module, or more than one subsequent module. In some examples, at least one module of the plurality of modules is connected by the edges within the directed graph to a plurality of preceding modules, or a plurality of subsequent modules, or a combination thereof. For example, a particular module may be connected to two or more preceding module and no subsequent module, two or more subsequent module and no preceding module, two or more preceding module and one or more subsequent module, two or more subsequent module and one or more preceding module, etc.

At block 320, the processing device may identify a first contract associated with the first module. In an implementation, the first contract specifies a first set of input criteria to be satisfied by one or more first input provided to the first module and a first set of output criteria to be satisfied by one or more first output generated by the first module. In some examples, the first set of input criteria in the first contract is specified in view of the at least one preceding module, and the first set of output criteria in the first contract is specified in view of the at least one subsequent module. In some examples, the processing device may first generate the first contract in view of the first module and additional modules connected to the first module within the directed graph.

At block 330, the processing device may determine whether the one or more first output satisfies the first set of output criteria when the one or more first input satisfies the first set of input criteria. The determination may be performed automatically (e.g., without any user interaction). In some examples, the determination is performed using a proof by exhaustion operation associated with execution of the first module. In some examples, the determination is performed using a set of sample inputs satisfying the first set of input criteria. In some examples, the processing device may further provide an indication that the first module satisfies a validity test, if it is determined that the one or more first output satisfies the first set of output criteria when the one or more first input satisfies the first set of input criteria. In some examples, the processing device may further provide an indication that the first module does not satisfy a validity test, when it is determined that the one or more first output does not satisfy the first set of output criteria when the one or more first input satisfies the first set of input criteria.

In some examples, the processing device may further access a second module of the plurality of modules of the literate programming document, wherein one or more second input is provided to the second module using the one or more first output generated by the first module; identify a second contract associated with the second module, wherein the second contract specifies a second set of input criteria to be satisfied by the one or more second input provided to the second module; and determine whether the one or more first output satisfies the second set of input criteria specified in the second contract.

In some examples, the processing device may further access a third module of the plurality of modules of the literate programming document, wherein the one or more first input is provided to the first module using one or more third output generated by the third module, and determine whether the one or more third output satisfies the first set of input criteria specified in the first contract.

In some examples, the processing device may further receive a modified version of the first module and determine whether one or more modified first output generated by the modified version of the first module satisfies the first set of output criteria when the one or more first input provided to the modified version of the first module satisfies the first set of input criteria.

Referring to FIG. 4, method 400 may be performed by processing devices of a server device or a client device and may begin at block 410. At block 410, a processing device may receive a first module of a plurality of modules of a literate programming document, wherein the plurality of modules are organized as a directed graph. In some examples, each module of the plurality of modules is connected by edges within the directed graph to at least one preceding module or at least one subsequent module, or a combination thereof. For example, a particular module may be connected to no preceding module, only one preceding module, or more than one preceding module. Similarly, the particular module may be connected to no subsequent module, only one subsequent module, or more than one subsequent module. In some examples, at least one module of the plurality of modules is connected by the edges within the directed graph to a plurality of preceding modules, or a plurality of subsequent modules, or a combination thereof. For example, a particular module may be connected to two or more preceding module and no subsequent module, two or more subsequent module and no preceding module, two or more preceding module and one or more subsequent module, two or more subsequent module and one or more preceding module, etc.

At block 420, a processing device may automatically (e.g., without any user interaction) generate a first contract associated with the first module in view of the first module and additional modules connected to the first module within the directed graph. In some examples, the first contract specifies a first set of input criteria associated with the first module and a first set of output criteria associated with the first module. In some examples, the first set of input criteria in the first contract is specified in view of the at least one preceding module, and the first set of output criteria in the first contract is specified in view of the at least one subsequent module.

At block 430, a processing device may determine whether one or more first output generated by the first module satisfies the first set of output criteria when one or more first input provided to the first module satisfies the first set of input criteria. The determination may be performed automatically (e.g., without any user interaction). In some examples, the determination is performed using a proof by exhaustion operation associated with execution of the first module. In some examples, the determination is performed using a set of sample inputs satisfying the first set of input criteria.

At block 440, a processing device may, provide an indication that the first module satisfies a validity test upon determination that the one or more first output satisfies the first set of output criteria when the one or more first input satisfies the first set of input criteria. Alternatively, in some examples, the processing device may provide an indication that the first module does not satisfy a validity test, when it is determined that the one or more first output does not satisfy the first set of output criteria when the one or more first input satisfies the first set of input criteria. The indication may be provided automatically (e.g., without any user interaction). In some examples, the indication may be provided using a reporting user interface. Additionally, in some examples, the processing device may further receive a modified version of the first module and determine whether one or more modified first output generated by the modified version of the first module satisfies the first set of output criteria when the one or more first input provided to the modified version of the first module satisfies the first set of input criteria.

Figure 5:
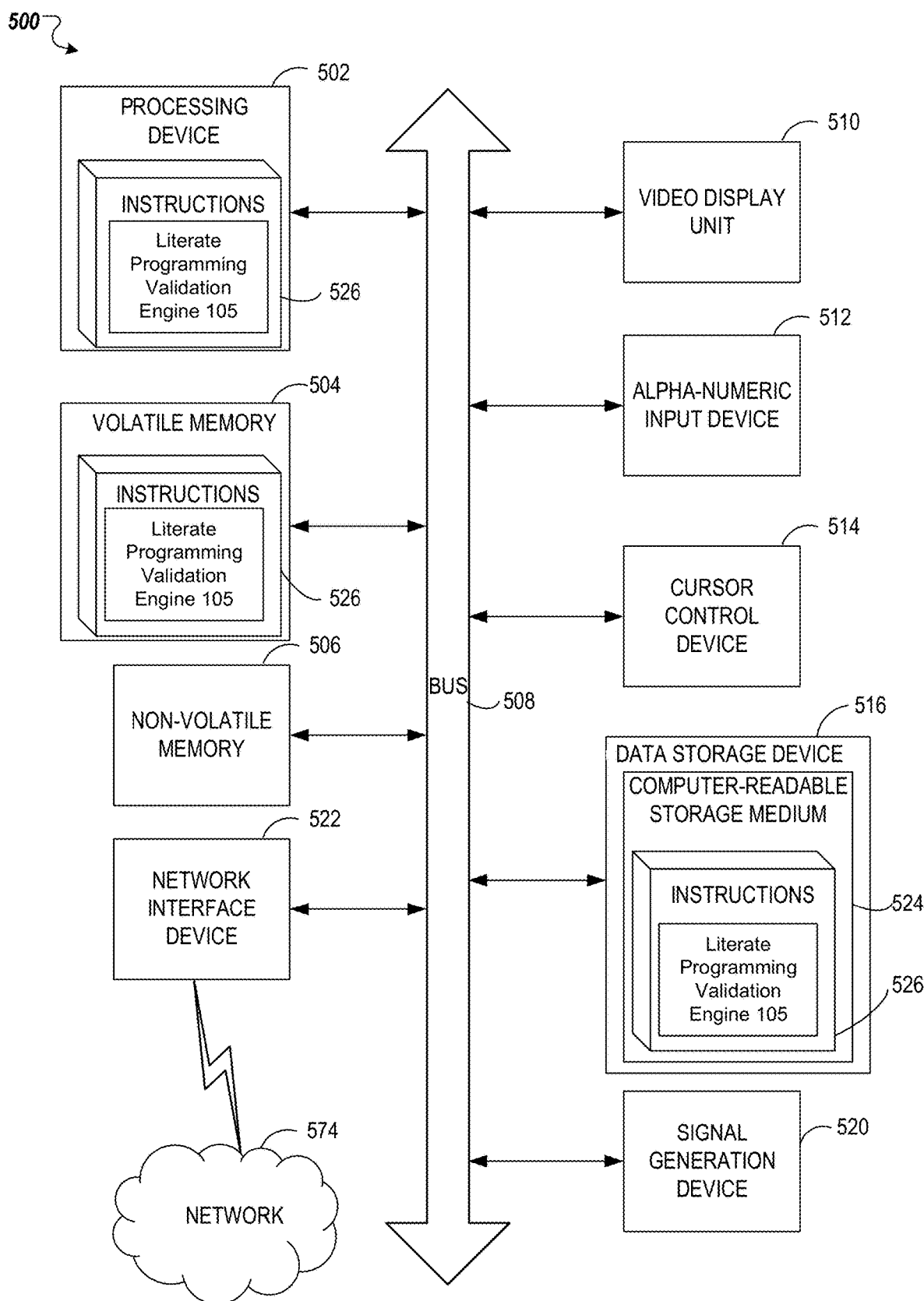
FIG. 5 depicts a block diagram of an illustrative computing device operating in accordance with the examples of the disclosure.

FIG. 5 depicts a block diagram of a computer system operating in accordance with one or more aspects of the disclosure. In various illustrative examples, computer system 500 may correspond to network architecture 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 or 400 for literate programming validation engine 105 (which may be the same as literate programming validation engine 105 of FIG. 1) and the components illustrated in FIGS. 1 and 2.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
   obtaining, by a processing device, a plurality of modules of a literate programming document for implementing an interactive tutorial related to a programming concept, each module of the plurality of modules providing instructional content relating to a respective unit of the programming concept, wherein each module of the plurality of modules corresponds to a node of a directed graph connected by an edge to at least one of: a preceding node corresponding to a preceding module, or a subsequent node corresponding to a subsequent module, wherein the plurality of modules comprises a common preamble module introducing the programming concept, and at least a set of first technique modules related to a first technique of the programming concept, and wherein each first technique module of the set of first technique modules branches from the common preamble module and provides instructional content relating to a respective implementation of the first technique;
   accessing, by the processing device, a first module of the plurality of modules;
   identifying, by the processing device, a first contract associated with the first module, wherein the first contract specifies a first set of input criteria to be satisfied by first input provided to the first module and a first set of output criteria to be satisfied by first output generated by the first module; and
   performing, by the processing device, a validity test with respect to the first module, wherein performing the validity test with respect to the first module comprises determining whether the first output satisfies the first set of output criteria and the first input satisfies the first set of input criteria.

2. The method of claim 1, further comprising:
   responsive to determining that the first output satisfies the first set of output criteria and the first input satisfies the first set of input criteria, providing an indication that the first module satisfies the validity test; and
   responsive to determining that the first output does not satisfy the first set of output criteria and the first input satisfies the first set of input criteria, providing an indication that the first module does not satisfy the validity test.

3. The method of claim 1, wherein the instructional content provided by each first technique module of the set of first technique modules comprises one or more of: source code, a visualization of an output of the source code generated by executing the source code, or natural language explanatory narration related to the source code.

4. The method of claim 3, wherein the plurality of modules are executable and the source code is compilable.

5. The method of claim 1, further comprising:
   receiving, by the processing device, a modified version of the first module; and
   determining, by the processing device, whether modified first output generated by the modified version of the first module satisfies the first set of output criteria and the first input provided to the modified version of the first module satisfies the first set of input criteria.

6. The method of claim 1, further comprising:
   accessing, by the processing device, a second module of the plurality of modules of the literate programming document, wherein second input is provided to the second module using the first output generated by the first module;
   identifying, by the processing device, a second contract associated with the second module, wherein the second contract specifies a second set of input criteria to be satisfied by the second input; and
   determining, by the processing device, whether the first output satisfies the second set of input criteria.

7. The method of claim 1, further comprising:
   accessing, by the processing device, a third module of the plurality of modules of the literate programming document, wherein the first input is provided to the first module using third output generated by the third module; and
   determining, by the processing device, whether the third output satisfies the first set of input criteria.

8. The method of claim 1, wherein determining whether the first output satisfies the first set of output criteria comprises using a proof by exhaustion operation associated with execution of the first module.

9. The method of claim 1, wherein determining whether the first output satisfies the first set of output criteria comprises using a set of sample inputs satisfying the first set of input criteria.

10. The method of claim 1, wherein:
at least one of the nodes is connected by a plurality of edges within the directed graph to one or more of: a plurality of preceding nodes corresponding to a plurality of preceding modules, or a plurality of subsequent nodes corresponding to a plurality of subsequent modules.

11. The method of claim 1, further comprising:
generating, by the processing device, the first contract in view of the first module and additional modules connected to the first module within the directed graph.

12. A system comprising:
a memory; and
a processing device communicably coupled to the memory to:
obtain a plurality of modules of a literate programming document for implementing an interactive tutorial related to a programming concept, each module of the plurality of modules providing instructional content relating to a respective unit of the programming concept, wherein each module of the plurality of modules corresponds to a node of a directed graph connected by at least one edge to at least one of: a preceding node corresponding to a preceding module, or a subsequent node corresponding to a subsequent module, wherein the plurality of modules comprises a common preamble module introducing the programming concept, and at least a set of first technique modules related to a first technique of the programming concept, and wherein each first technique module of the set of first technique modules branches from the common preamble module and provides instructional content relating to a respective implementation of the first technique;
receive a first module of the plurality of modules;
generate a first contract associated with the first module in view of the first module and additional modules connected to the first module within the directed graph, wherein the first contract specifies a first set of input criteria associated with the first module and a first set of output criteria associated with the first module;
determine whether first output generated by the first module satisfies the first set of output criteria and first input provided to the first module satisfies the first set of input criteria; and
upon a determination that the first output satisfies the first set of output criteria and the one or more first input satisfies the first set of input criteria, provide an indication that the first module satisfies a validity test.

13. The system of claim 12, wherein the processing device is further to:
receive a modified version of the first module; and
determine whether modified first output generated by the modified version of the first module satisfies the first set of output criteria and the first input provided to the modified version of the first module satisfies the first set of input criteria.

14. The system of claim 12, wherein the determination is performed using a proof by exhaustion operation associated with execution of the first module.

15. The system of claim 11, wherein:
at least one of the nodes is connected by a plurality of edges within the directed graph to one or more of: a plurality of preceding nodes corresponding to a plurality of preceding modules, or a plurality of subsequent nodes corresponding to a plurality of subsequent modules.

16. The system of claim 12, wherein the processing device is further to:
receive a second module of the plurality of modules of the literate programming document, wherein second input is provided to the second module using the first output generated by the first module;
identify a second contract associated with the second module, wherein the second contract specifies a second set of input criteria to be satisfied by the second input; and
determine whether the first output satisfies the second set of input criteria.

17. A non-transitory machine-readable storage medium storing instructions that cause a processing device to:
obtain a plurality of modules of a literate programming document for implementing an interactive tutorial related to a programming concept, each module of the plurality of modules providing instructional content relating to a respective unit of the programming concept, wherein each module of the plurality of modules corresponds to a node of a directed graph connected by at least one edge to at least one of: a preceding node corresponding to a preceding module, or a subsequent node corresponding to a subsequent module, wherein the plurality of modules comprises a common preamble module introducing the programming concept, and at least a set of first technique modules related to a first technique of the programming concept, and wherein each first technique module of the set of first technique modules branches from the common preamble module and provides instructional content relating to a respective implementation of the first technique;
receive a first module of the plurality of modules;
identify a first contract associated with the first module, wherein the first contract specifies, in view of the preceding module, a first set of input criteria to be satisfied by first input provided to the first module and specifies, in view of the subsequent module, a first set of output criteria to be satisfied by first output generated by the first module; and
perform a validity test with respect to the first module, wherein, to perform the validity test, the processing device is to determine whether the first output satisfies the first set of output criteria and the first input satisfies the first set of input criteria.

18. The non-transitory machine-readable storage medium of claim 17, wherein the processing device is further to:
upon a determination that the first output satisfies the first set of output criteria and the first input satisfies the first set of input criteria, provide an indication that the first module satisfies the validity test; and
upon a determination that the first output does not satisfy the first set of output criteria and the first input satisfies the first set of input criteria, provide an indication that the first module does not satisfy the validity test.

19. The non-transitory machine-readable storage medium of claim 17, wherein at least one module of the plurality of modules is connected by edges within the directed graph to one or more of: multiple subsequent modules, or multiple preceding modules.

20. The non-transitory machine-readable storage medium of claim 17, wherein the processing device is further to:
   generate the first contract in view of the first module and additional modules connected to the first module within the directed graph.

\* \* \* \* \*